United States Patent [19]
Wilcox et al.

[11] Patent Number: 5,649,309
[45] Date of Patent: Jul. 15, 1997

[54] WIRELESS COMMUNICATION DEVICE HAVING AN AXIALLY ALIGNED COVER RELEASE MECHANISM

[75] Inventors: Scott Robert Wilcox, Palatine; Brian Jon Hassemer, Gurnee; Stephen John Gaynes, Wonder Lake, all of Ill.

[73] Assignee: Motorola, Inc., Schaumburg, Ill.

[21] Appl. No.: 443,938

[22] Filed: May 18, 1995

[51] Int. Cl.$^6$ ................................................. H04B 1/38
[52] U.S. Cl. .......................................... 455/90; 455/575
[58] Field of Search .............................. 455/89, 90, 128, 455/351; 16/342, 321, 323, 325, 344, 345; 379/433, 428

[56] References Cited

U.S. PATENT DOCUMENTS

| | | | |
|---|---|---|---|
| 5,027,394 | 6/1991 | Ono et al. | 379/434 |
| 5,111,503 | 5/1992 | Takagi | 379/433 |
| 5,117,073 | 5/1992 | Mischenko | 200/61.7 |
| 5,151,643 | 9/1992 | Emmert et al. | 455/90 |
| 5,257,310 | 10/1993 | Takagi et al. | 379/433 |
| 5,278,993 | 1/1994 | Reiff et al. | 455/351 |

FOREIGN PATENT DOCUMENTS

| | | | |
|---|---|---|---|
| 0 588 210 A1 | 3/1994 | European Pat. Off. | |
| WO9005421 | 5/1990 | WIPO | H04M 1/03 |
| WO92/17973 | 10/1992 | WIPO | |
| WO9318592 | 9/1993 | WIPO | H04B 1/08 |

*Primary Examiner*—Reinhard J. Eisenzopf
*Assistant Examiner*—Marsha D. Banks-Harold
*Attorney, Agent, or Firm*—Donald C. Kordich

[57] ABSTRACT

A radiotelephone (100) has a hinge (301) for joining a body (101) a cover (103) along an axis. The hinge (301) has a release and position mechanism (303) aligned along the axis that secures cover (103) in the closed position and releases cover (103) from the closed position. The hinge (301) further has an opening mechanism (305) that urges cover (103) from the closed position to the open position. The release and position mechanism (303) and the opening mechanism (305) secure cover (103) in the open position.

10 Claims, 7 Drawing Sheets

WIRELESS COMMUNICATION DEVICE HAVING AN AXIALLY ALIGNED COVER RELEASE MECHANISM

FIELD OF THE INVENTION

The present invention relates generally to the field of wireless communication devices, and more particularly to foldable, wireless communication devices.

BACKGROUND OF THE INVENTION

Users of wireless communication devices communicate telephonically over a wireless system at virtually any location. A portable wireless communication device transmits a low wattage, radio frequency signal to a receiving apparatus. An example of a wireless communication device is a portable radiotelephone that communicates with a base station, which may be connected with conventional landline systems, such as a Public Telephone Service Network.

Portable radiotelephones having two housings joined along an axis by a hinge that allows the housings to fold upon one another are known in the art. Some known folding radiotelephones have most of the electronics in one housing, called the body. The other housing, called the cover, normally contains fewer electronic components than the body. In a closed position, the cover is folded upon the body. In an open position, the cover is at an obtuse angle to the body.

One type of known folding radiotelephones utilizes a hinge having a torsional spring in line with the axis to move the cover from the closed position to the open position. To secure the cover to the body and resist the force of the torsional spring, the radiotelephone necessarily has a latch distal from the axis of rotation to lock the cover to the body. Also, to counteract the force of the torsional spring, a stop element, which is independent of the latch, is necessary to hold the cover in the open position. In this type of portable radiotelephone, the user is required to activate the latch, e.g., by using one hand to press a button, to release the cover so that the torsional spring can rotate the cover to the open position. The user must use the latch to release the cover, or else the latch will be broken when the user uses two hands to manually force the cover from the closed position.

Another type of known folding radiotelephones utilizes a hinge having a spring and hinge pins disposed in a tubular hinge arm formed at an end of the cover, and bushings formed in the body. The spring is positioned between the hinge pins and at all times outwardly forces the hinge pins from the cover to the body, along the rotating axis. In this type of folding radiotelephones the hinge mechanism urges the cover to remain in the closed position without the use of a latch. Accordingly, this hinge mechanism does not have the disadvantages associated with a latch. To release the cover from the closed position, however, rather than using one hand to press a button to release the cover from the closed position, the user must manually overcome the spring force holding the cover in the closed position. This usually requires the user's two hands. An example of such known radiotelephones is described in PCT Publication No. WO 93/18592, published September 16.

Although suitable for some foldable radiotelephones, such known hinges are not suitable for all users of foldable radiotelephones or wireless communication devices. In the types of foldable radiotelephones that can be opened with one hand using the button-actuated latch, the radiotelephone does not have the advantages that an axially spring-loaded hinge provides, e.g., eliminating the problems associated with a latch. Further, with the increased miniaturization of radiotelephones there is less space on the housing to accommodate a latch distal the axis of rotation. Accordingly, none of the known foldable communication devices have the combination of the convenience of a button-actuated latch to release the cover, the user option to use the button-actuated latch to release the cover or manually open the cover, and a compact design.

A need therefore exists for wireless communication devices that can easily be opened by a release mechanism, but does not have the disadvantages associated with a conventional latch.

DESCRIPTION OF THE PREFERRED EMBODIMENT

Figures 1, 2:
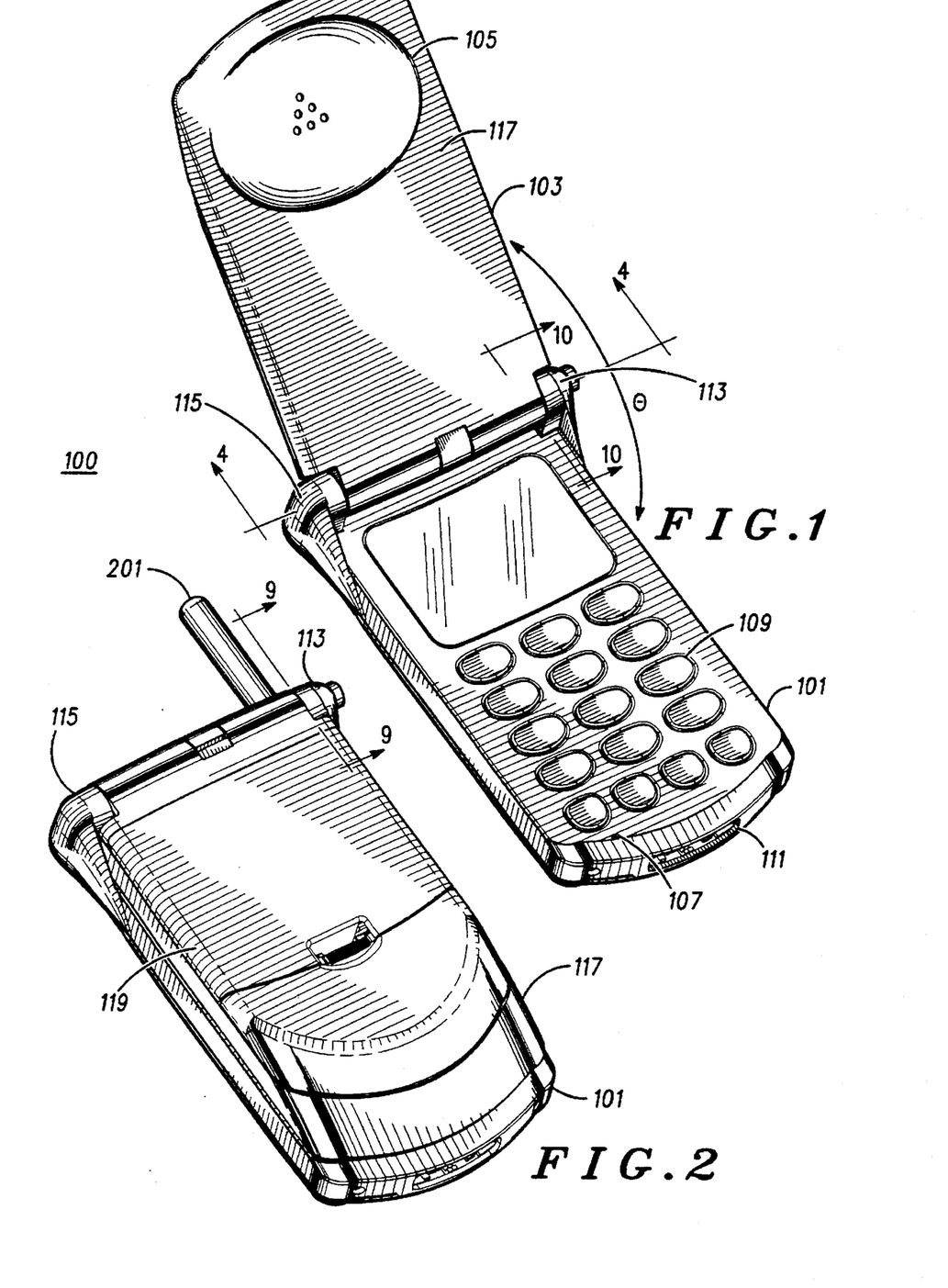
FIG. 1 is a top, left, and front perspective view of a radiotelephone in an open position, configured in accordance with the invention.
FIG. 2 is a top, left, and front perspective view of the radiotelephone shown in FIG. 1 in a closed position, configured in accordance with the invention.

The exemplary embodiment of a wireless communication device, i.e., a foldable, portable radiotelephone 100, of the present invention is shown in FIGS. 1 and 2. Radiotelephone 100 basically has two readily apparent portions, a body 101 and a cover 103 joined along an axis. The drawing of FIG. 1 shows a top, left, and front perspective view of radiotelephone 100 with cover 103 in an "open" position so that a user of radiotelephone 100 can listen via an earpiece 105 and speak into a microphone 107. The drawing of FIG. 2 shows a top, left, and front perspective view of radiotelephone 100 with cover 103 in a "closed" position.

Body 101 includes a keypad 109 having a plurality of buttons numbered one through zero, #, and *, in a familiar telephone arrangement. Keypad 109 may also have additional functions buttons such as channel select, volume control, and other buttons associated with telephone number recall. Body 101 also has an antenna 201 that enables wireless communication between radiotelephone 100 and a base station (not shown) of a cellular radiotelephone system. Body 101 further includes a port 111 that allows radiotelephone 100 to connect with peripheral components, for example, a battery charger and external antenna, keypad, speaker, or microphone.

As shown in FIG. 2, cover 103 includes two substantially planar housing parts-cover bottom 117 and cover top 119. Also, body 101 has knuckles 113,115 integrally formed on body 101.

Figure 3:
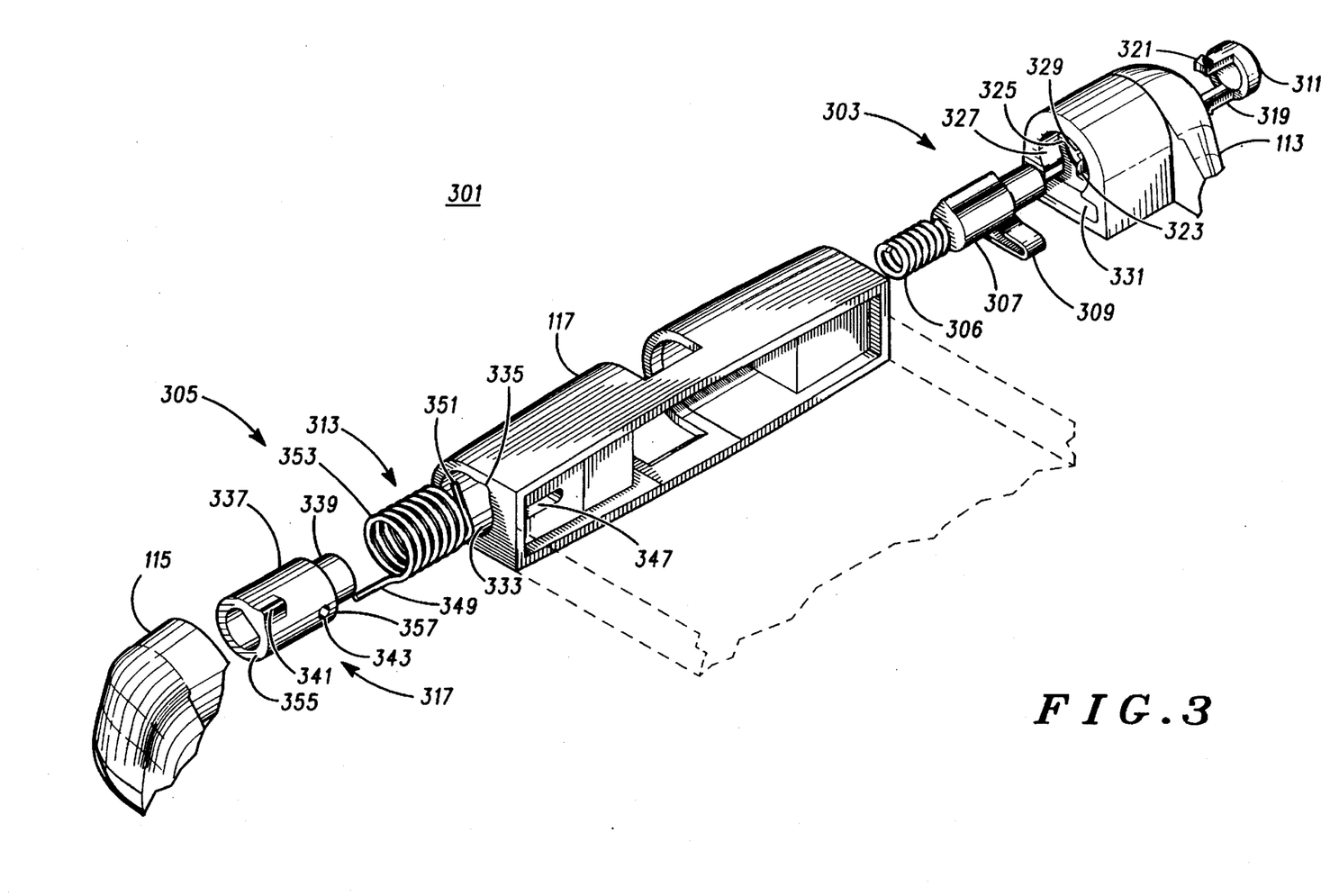
FIG. 3 is a top, left, and front perspective, exploded view of a hinge of the radiotelephone shown in FIG. 2, configured in accordance with the invention.

A hinge 301 joins cover 103 (via cover bottom 117) to body 101 (via knuckles 113,115) along the axis. As shown in FIG. 3, which is a top, left, and front perspective, exploded view of hinge 301, hinge 301 has two portions: a release and position mechanism 303 and an opening mechanism 305. Release and position mechanism 303 includes a compression spring 306, a cam 307, a leaf spring 309, and a button 311. Opening mechanism 305 includes a torsional spring 313 and a shaft 317.

Figure 4:
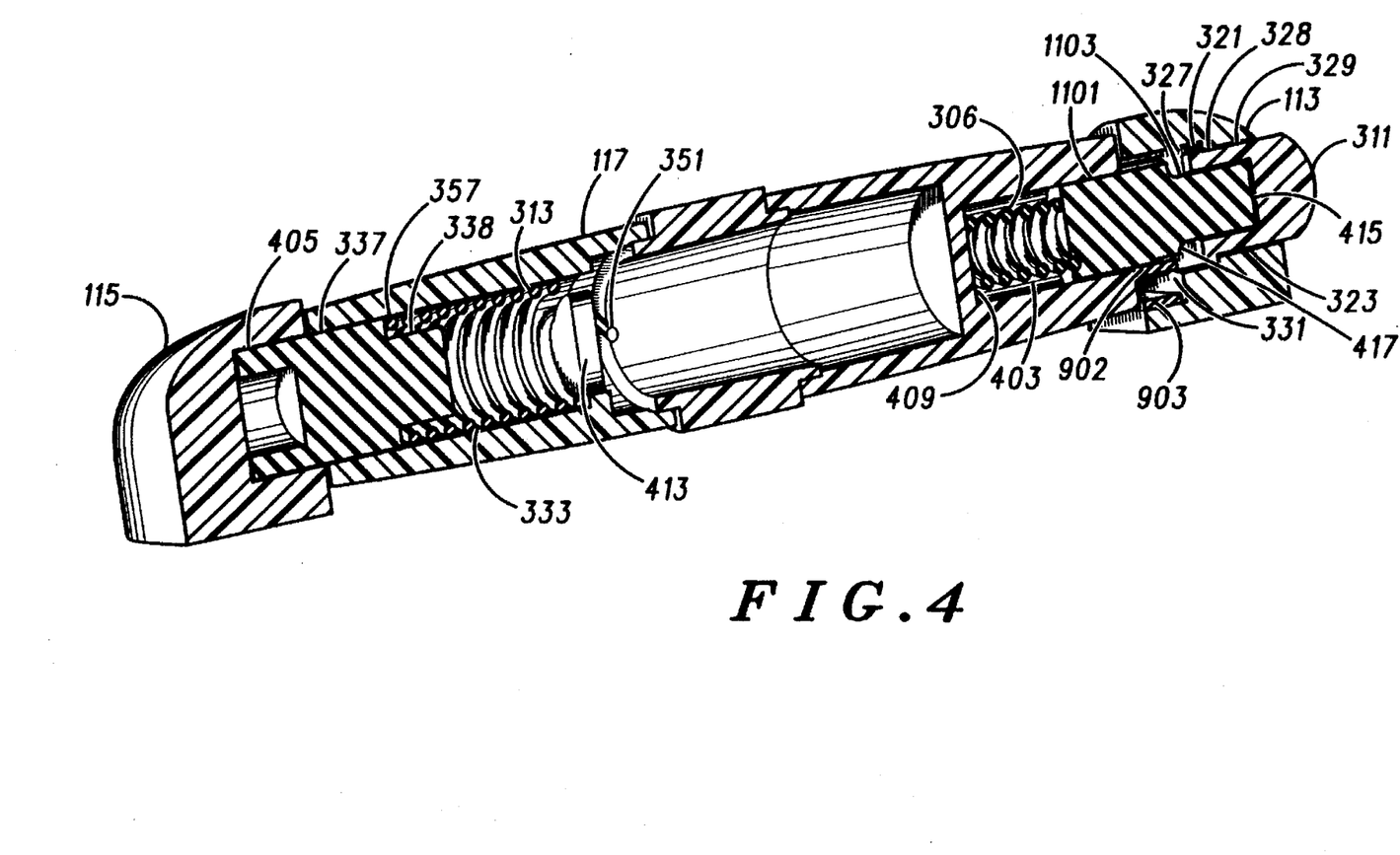
FIG. 4 is a cross sectional view taken along a rotating axis of the radiotelephone shown in FIG. 2.

As shown in FIG. 4, which is a cross sectional view of radiotelephone 100 taken along the rotating axis with cover 103 in the closed position, knuckle 113 is provided with a cavity 325, knuckle 115 is provided with a cavity 405, and cover bottom 117 is provided with a cavity 403 and a cavity 333. Release and position mechanism 303 is aligned along the axis, located at one side of cover bottom 117, and contacts cover 103 and body 101. In particular, release and position mechanism 303 is located in cavity 325 and cavity 403. On the other hand, opening mechanism 305 is aligned along the axis, located at the other side of cover bottom 117, and contacts cover 103 and body 101. In particular, opening mechanism 305 is located in cavity 405 and cavity 333.

The design of hinge 301 provides many advantages. As described in detail below, release and position mechanism 303 allows cover 103 to be secured against keypad 109 in the closed position without using a conventional latch. Accordingly, the space on radiotelephone 100 occupied by the mechanism for releasing and positioning the cover is minimized. Further, the design allows cover 103 to be held at an obtuse angle (for example, Θ equals 148°) in the open position, and allows cover 103 to overtravel the open position (for example, Θ equals 176°). Another advantage provided by release and position mechanism 303 is that cover 103 can be released from the closed position by pushing button 311, thus allowing the user to use one hand to release cover 103 from the closed position. Also, the design alternately allows the user to manually release cover 103 from the closed position without using button 311 and without breaking the mechanism that releases cover 103 from the closed position.

Additional advantages of the preferred embodiment of the present invention are provided by opening mechanism 305. Opening mechanism 305 provides spring force assistance in moving cover 103 from the closed position after release and position mechanism 303 releases cover 103 from the closed position. Further, opening mechanism 305 also provides spring force assistance in moving cover 103 from the closed position to the open position, and continues to supply the spring force when cover 103 reaches the open position. Thus, the opposing forces of opening mechanism 305 and release and position mechanism 303 secure cover 103 in the open position.

The details of this invention are described below, beginning with the structure and assembly of cover 103, body 101, release and position mechanism 303, and opening mechanism 305 of the preferred embodiment of the invention.

At one side of cover 103 and body 101, release and position mechanism 303 is located.

As shown in FIGS. 3 and 4, cavity 325 has contiguously aligned along the axis a large cylindrical portion 327 near cover bottom 117, a medium cylindrical portion 328, and a small cylindrical portion 329 located between large cylindrical portion 327 and medium cylindrical portion 328. Further, cavity 325 has a substantially rectangular portion 331 contiguous large cylindrical portion 327. Channels 323 of substantially rectangular shape are formed on the surface of small cylindrical portion 329.

As shown in FIG. 3, release and position mechanism 303 includes button 311 composed of plastic. Button 311 has protruding, rectangularly shaped arms 319. Each arm 319 has a barb 321 located at the end of arm 319. As shown in FIG. 4, arms 319 are located in channels 323, which are shaped for receiving arms 319 and latching barbs 321. Button 311 is rotatably fixed and axially slideable in knuckle 113, barbs 321 limiting the axial movement of button 311 away from cover bottom 117.

Figure 9:
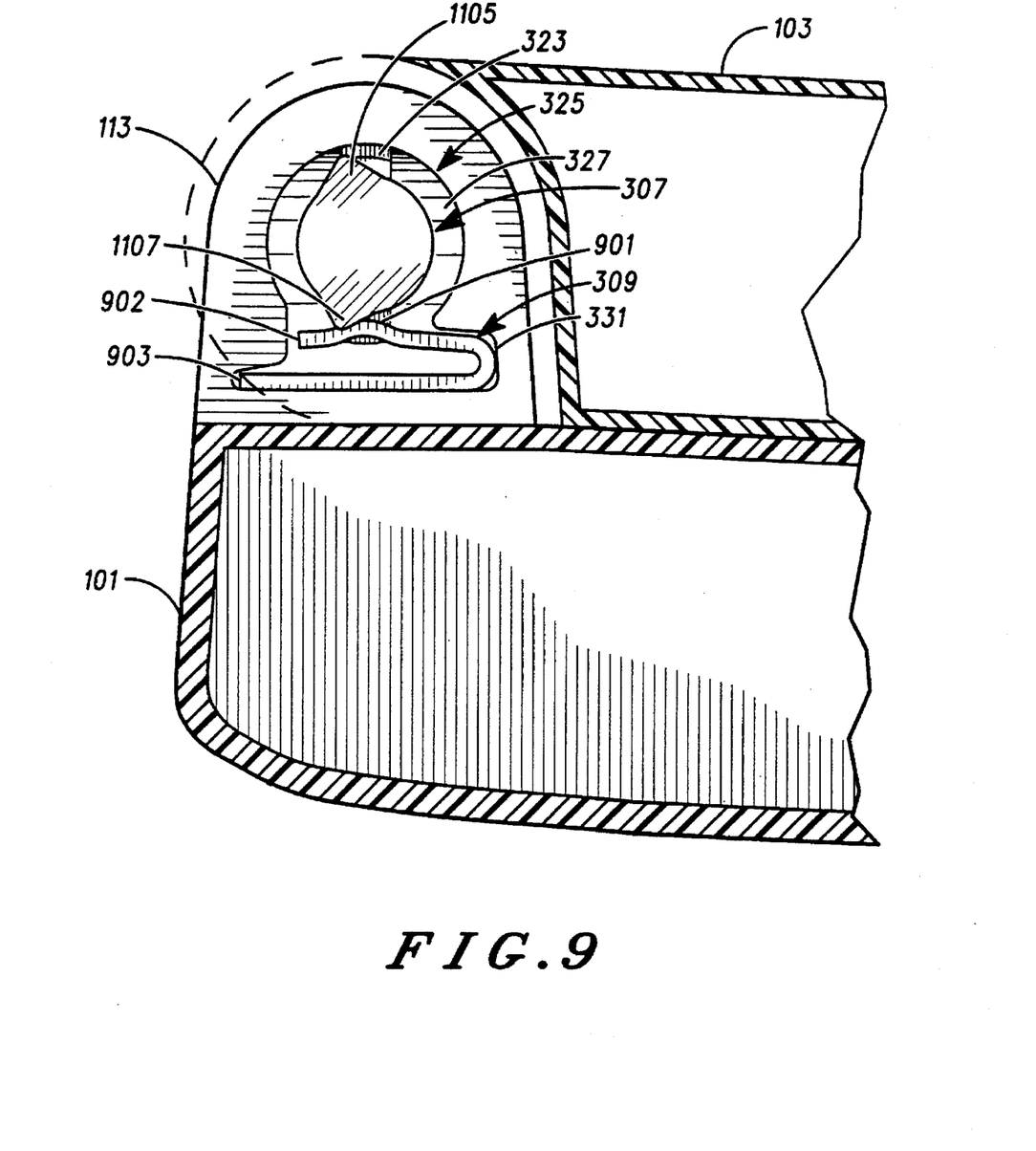
FIG. 9 is a cross sectional view taken along a knuckle of the radiotelephone shown in FIG. 2.

Release and position mechanism 303 also includes leaf spring 309, composed of metal. Leaf spring 309 is located in cavity 331, as shown in FIG. 4. As shown in FIG. 9, leaf spring 309 is a thin, flat, rectangularly shaped piece of metal folded back upon itself, in a U-shape, to form a long leg 903 and a short leg 902. A bump 901 is formed on short leg 902. Leaf spring 309 is fixed to knuckle 113 by wedging long leg 903 and the U-shaped end into rectangular portion 331. In this position, short leg 902 is free to flex within cavity 325.

Figure 11:
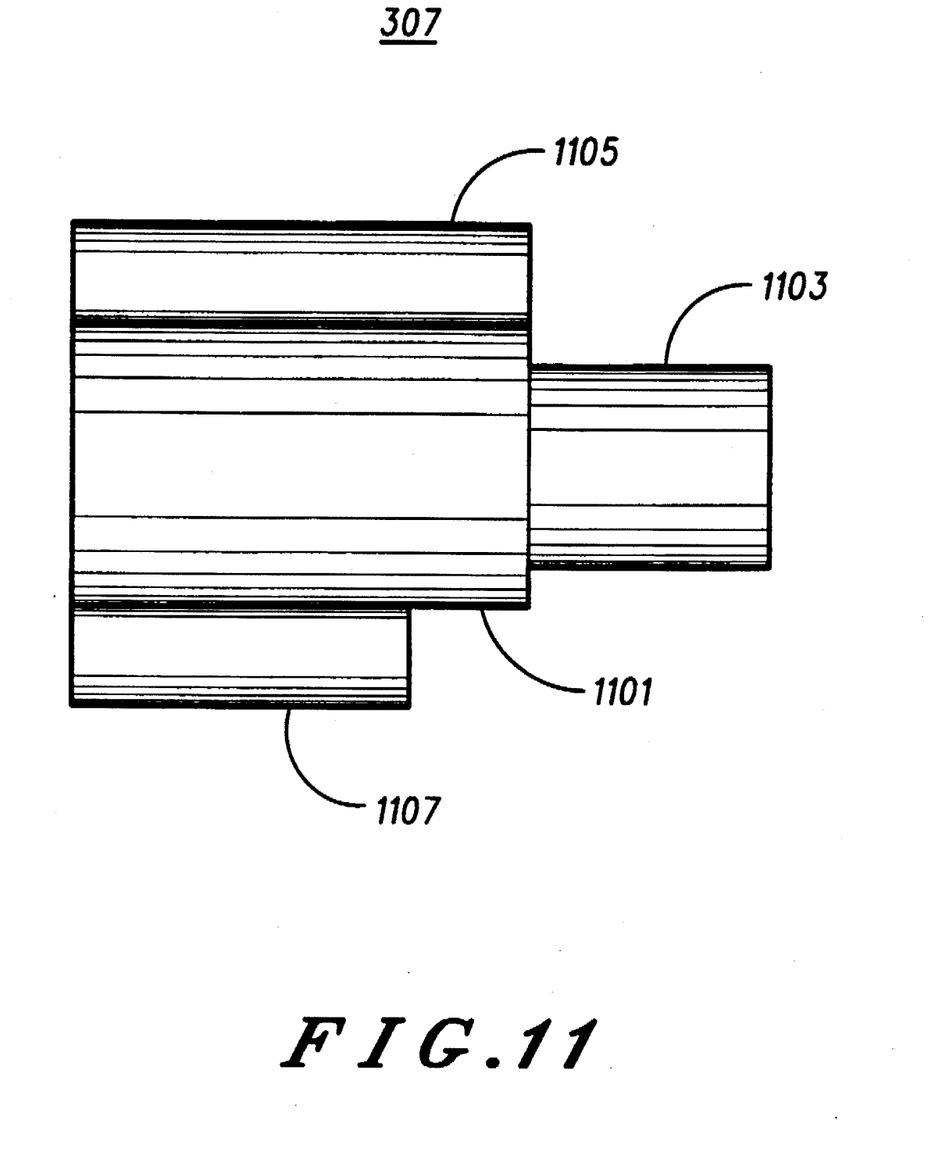
FIG. 11 is a front elevational view of a cam shown in FIG. 3.

Release and position mechanism 303 further includes cam 307 formed of solid metal. Cam 307 has, as shown in FIGS. 3 and 11 (FIG. 11 being a front elevational view of cam 307), a large cylinder 1101 and a small cylinder 1103 adjacent large cylinder 1101. Large cylinder 1101 has formed on its surface a long lobe 1105 extending substantially the height of large cylinder 1101 and a short lobe 1107 extending less than the height of large cylinder 1101. Long lobe 1105 and short lobe 1107 are radially spaced an angle corresponding to the obtuse angle of cover 103 in the open position.

As shown in FIG. 4, cam 307 is disposed in cavity 325 and cavity 403 and secures the alignment of knuckle 113 and cover bottom 117. Cam 307 is axially and rotatably slideable in the cavities within limits.

In particular, small cylinder 1103 extends through and beyond small cylindrical portion 329 so that an end 415 of small cylinder 1103 contacts button 311. End 415 is in rotatably slideable contact with button 311; and, the surface of small cylinder 1103 is in axially and rotatably slideable contact with the surface of small cylindrical portion 329. Further, the arrangement of button 311 and small cylinder 1103 in small cylindrical portion 329 radially fixes cam 307 to knuckle 113.

Figure 5:
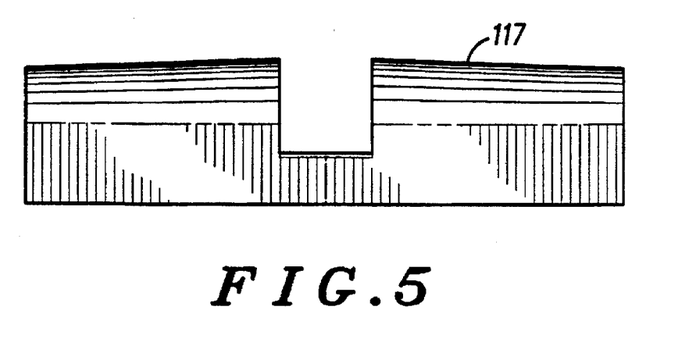
FIG. 5 is a top plan view of a cover bottom shown in FIG. 3.
Figure 6:
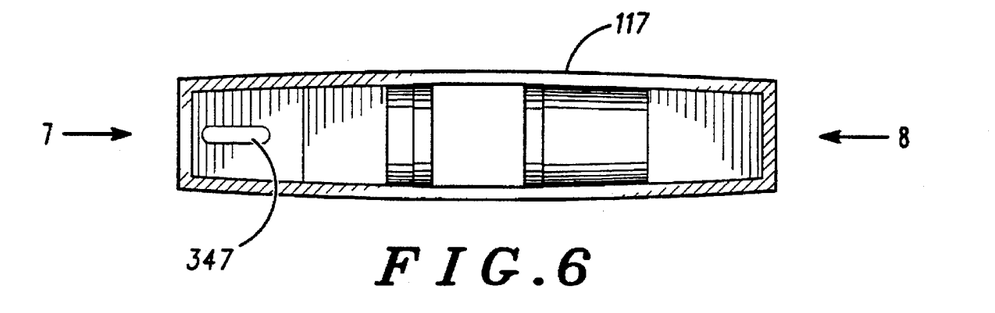
FIG. 6 is a front elevational view of a cover bottom shown in FIG. 3.
Figure 8:
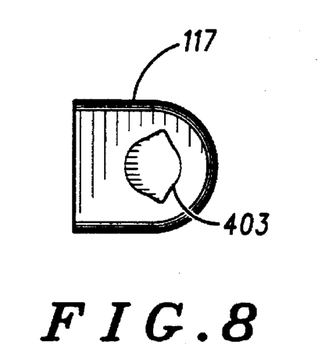
FIG. 8 is right side elevational view of a cover bottom shown in FIG. 3.

Furthermore, large cylinder 1101 is located in large cylindrical portion 327 and cavity 403. Large cylinder 1101 is axially slideable in large cylindrical portion 327; but, an end 417 of large cylinder 1101 abuts the inner wall of small cylindrical portion 329, thus limiting the axial movement of cam 307 away from cover bottom 117. Moreover, as shown in FIG. 8, which is a right side elevational view cover bottom 117, cavity 403 is shaped to fit the contours of large cylinder 1101. (FIG. 5 is a top plan view of cover bottom 117; FIG. 6 is a front elevational view of cover bottom 117.) This arrangement of large cylinder 11 01 and cavity 403 radially and rotatably fixes cam 307 to cover bottom 117; but, cam 307 is axially slideable in cover bottom 117.

Figure 10:
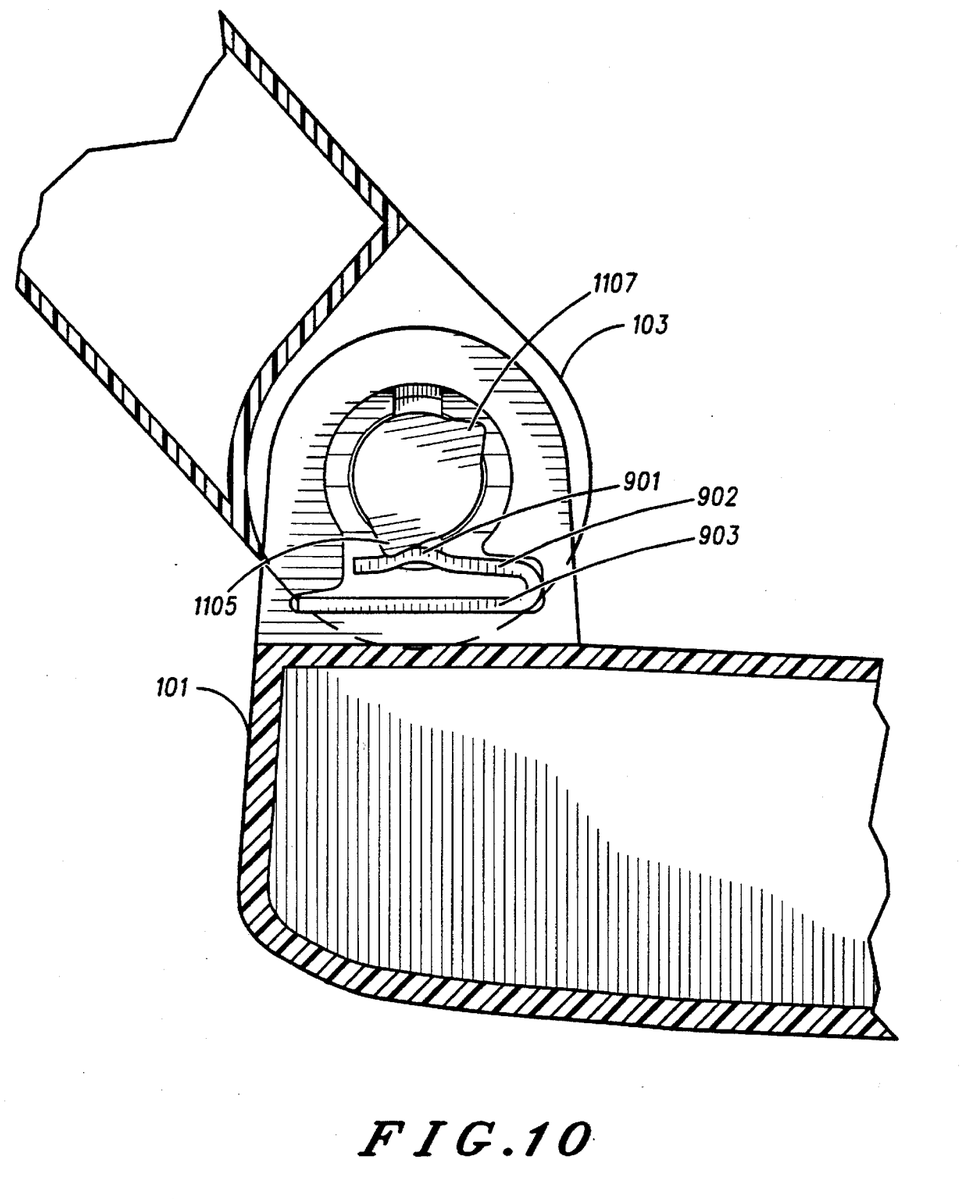
FIG. 10 is a cross sectional view taken along a knuckle of the radiotelephone shown in FIG. 1.

Moreover, large cylinder 1101 is rotatably slideable in large cylindrical portion 327 but has rotational limits defined by leaf spring 309 and lobes 1105,1107. As shown in FIG. 9, which is a cross sectional view taken along knuckle 113 with cover 103 in the closed position, short lobe 1107 is in axially and rotatably slideable contact with short leg 902. In this closed position, cover 103 is secured in the closed position by the force of leaf spring 309 against short lobe 1107. As shown in FIG. 10, which is a cross sectional view taken along knuckle 113 with cover 103 in the open position, long lobe 1105 is in rotatably slideable contact with short leg 902. In this open position, cover 103 is held in the closed position by the force of leaf spring 309 against long lobe 1105. The force of leaf spring 309 necessary to achieve this result is a well understood prior art technique. Although not shown, when button 311 is pressed, cam 307 is forced towards cover bottom 117, causing short lobe 1107 to clear bump 901 and, as cover 103 is rotated from the closed position, an end of short lobe 1107 is in rotatably slideable contact with an edge of short leg 902 for a portion of the rotation.

Release and position mechanism 303 further includes compression spring 306 that is spiral-shaped and composed of metal. As shown in FIG. 4, compression spring 306 is located in cavity 403 and is in rotatable contact with cavity 403. One end of compression spring 306 is in rotatable slideable contact with an end wall 409 of cavity 403, and another end is in rotatable slideable contact with an end of large cylinder 1101.

Compression spring 306 applies a force on cam 307 in a direction away from cover bottom 117, thus biasing cam 307 against knuckle 113 when cover 103 is in open or closed positions. Furthermore, compression spring 306 opposes the force applied to cam 307 when button 311 is pressed by the user.

The assembly of release and position mechanism 303 into cover bottom 117 and knuckle 113 will now be described.

Button 311 is inserted into knuckle 113, and leaf spring 309 is inserted into rectangular portion 331. Compression spring 306 is inserted into cavity 403; and cam 307 is inserted into cavity 403, compressing compression spring 306, until end 415 is nearly flush with cover bottom 117. Cover bottom 117 and knuckle 113 are aligned; and, under force of compression spring 306, cam 307 is forced into cavity 325.

At the other side of radiotelephone 100, opening mechanism 305 is located.

Figure 7:
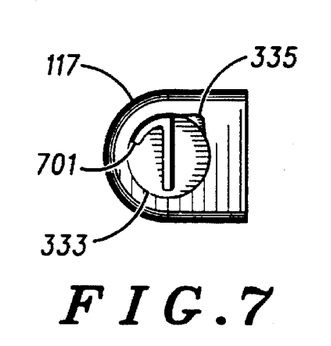
FIG. 7 is left side elevational view of cover bottom shown in FIG. 3.

As shown in FIGS. 3, 4, and 7 (FIG. 7 being a left side elevational view of cover bottom 117), cavity 333 is substantially cylindrically shaped and has a plate 413 dividing cavity 333 from an adjoining cavity provided in cover bottom 117. Also, cavity 333 has a notch 335 formed on the wall defining cavity 333. Plate 413 is provided with an aperture 701 that provides a passage from cavity 333 to the adjoining cavity.

Opening mechanism 305 includes torsional spring 313 composed of metal and is substantially spiral shaped. As shown in FIG. 4, torsional spring 313 is located in cavity 333. A stub 351 at the end of torsional spring 313 extends through aperture 701, axially and rotatably fixing the end of torsional spring 313 to cover bottom 117. An other spiral end 353 of torsional spring 313 terminates in a tail 349 running substantially parallel to the axis.

Opening mechanism 305 also includes shaft 317 composed of a single piece of plastic. As shown in FIG. 3, shaft 317 has two contiguous portions: large cylinder 337 and small cylinder 339. Large cylinder 337 has a key 341 formed on its surface at an end distal cover bottom 117, and a hole 343 formed in its surface near an end closer to cover bottom 117. Large cylinder 337 further has an end 355 facing knuckle 115 and end 357 facing cover bottom 117.

As shown in FIG. 4, shaft 317 is located in cavity 333 and cavity 405 and secures alignment of knuckle 115 and cover bottom 117. Shaft 317 is axially and rotatably slideable in cavity 333 within limits and axially slideable in cavity 405 within limits.

In particular, shaft 317 is limited in movement away from cover bottom 117 by the end wall of cavity 405, and in movement towards cover bottom 117 by torsional spring 313. That is, large cylinder 337 is partially located in each of cavity 333 and cavity 405, and small cylinder 339 is located in cavity 333. Further, small cylinder 339 is located inside torsional spring 313, spiral end 353 being in contact with end 357. Also, tail 349 is rotatably fixed to large cylinder 337 by tail 349 being located inside a well 411 (not shown) in end 357.

End 357 compresses torsional spring 313 inside cavity 333. Consequently, torsional spring 313 applies an axial force towards knuckle 115 that forces shaft 317 into knuckle 115. Moreover, torsional spring 313 is loaded during assembly, as described in detail below, which causes torsional spring 313 to apply a torsional force to cover bottom 117 that urges cover 103 to move to the open position.

Knuckle 115 has a cavity 405 that is substantially cylindrically shaped with a notch 419 (not shown) formed on its circumference for receiving large cylinder 337 and key 341. Notch 419 and key 341 rotatably fix shaft 317 to knuckle 115.

The torsional force of torsional spring 313 is chosen so that it does not overcome the force supplied by the release and position mechanism 303 that secures cover 103 in the closed position or holds cover 103 in the open position. Moreover, the torsional force is chosen so that when release and position mechanism 303 releases cover bottom 117 from the closed position, torsional spring 313 applies sufficient rotational force on cover bottom 117 to rotate cover 103 from the closed position to the open position. The rotational force of torsional spring 313 necessary to achieve these results is a well understood prior art technique.

The assembly of opening mechanism 305 into cover bottom 117 and knuckle 115 will now be described.

After release and position mechanism 303 is assembled into knuckle 113 and cover bottom 117, tail 349 is inserted into well 411. Torsional spring 313 and shaft 317 are inserted into cavity 333 and arranged so that stub 351 wraps around plate 413 to fix stub 351 to plate 413. Torsional spring 313 is then torsionally loaded by rotating clockwise (as viewed from knuckle 115 to cover bottom 117) shaft 317 until key 341 aligns with notch 335. Shaft 317 is then moved axially into cavity 333, compressing torsional spring 313. By way of a tool (not shown) inserted into slot 347 that engages hole 343, shaft 317 is further moved into cavity 333 until end 355 is flush with cover bottom 117. Shaft 317 is then aligned with knuckle 115, key 341 aligning with a notch (not shown) in knuckle 115. The tool releases shaft 317, permitting torsional spring 313 to force shaft 317 into cavity 405.

The operation of radiotelephone 100 will now be described.

In the closed position, shown in FIG. 2, cover 103 is held closed by release and position mechanism 303, even though opening mechanism 305 is supplying a rotational force urging cover 103 to the open position. In particular, as shown in FIG. 9, leaf spring 309 forces bump 901 against short lobe 1107, thus counteracting the rotational force supplied by opening mechanism 305. As a result, cover 103 is secured in the closed position without the use of a conventional latch located distal the axis of rotation. Consequently, a compact design is achieved.

To open cover 103, button 311 is depressed, which causes cam 307 to move axially towards cover bottom 117 until short lobe 1107 clears leaf spring 309. Accordingly, the user can release cover 103 from the closed position using one hand. Alternatively, the user may manually force cover 103 open, causing short lobe 1107 to flex short leg 902 and allowing short lobe 1107 to slide over bump 901. Accordingly, the user has the option to manually release cover 103 from the closed position without damaging the release mechanism.

Regardless of way cover 103 is released from the closed position, without the counteracting force supplied by leaf spring 309 on short lobe 1107, opening mechanism 305 urges cover bottom 117 to rotate about the axis from the closed position. Rotation continues until long lobe 1105 contacts bump 901, where cover 103 is held in the open position.

Moreover, the combined forces of leaf spring 309 and torsional spring 313 secures cover 103 in the open position. In particular, torsional spring 313, having tail 349 rotatably fixed to shaft 317, begins to unwind. Thus stub 351 rotates, forcing cover bottom 117 to rotate. The rotation of cover bottom 117 forces cam 307 to rotate. The rotation of cam 307 continues until long lobe 1105 contacts bump 901, as shown in FIG. 10. At this point, leaf spring 309 forces bump 901 against long lobe 1105, thus counteracting the rotational force supplied by opening mechanism 305. Consequently, cover 103 is secured in the open position by the opposing forces of opening mechanism 305 and the release and position mechanism 303.

Furthermore, the user may continue rotation of cover 103 beyond the open position, causing long lobe 1105 to flex short leg 902 and allowing long lobe 1105 to slide over bump 901. Accordingly, cover 103 can overtravel.

As such, this embodiment configured in accordance with the invention provides numerous advantages over the known art, e.g., the convenience of a button-actuated release of cover 103, the user option to use the button-actuated release or manually open cover 103, and a compact design.

Those skilled in the art will recognize that various modifications and variations can be made in the radiotelephone of the present invention and in construction of this radiotelephone without departing from the scope or spirit of this invention. As examples, another type of opening mechanism may replace opening mechanism 305. Also, opening mechanism 305 may be replaced with an idler shaft and gravity, or another force, to urge cover 103 from the open position to the closed position. Compression spring 306 and torsional spring 313 may be replaced with other spring elements that provide the necessary compressive and torsional forces, respectively. The elements of hinge 301 may be of any suitable materials, e.g., plastic or metal. Also, the means for aligning and for fixing the components of hinge 301, e.g., key 341, lobes 1105, 1107, stub 351, tail 349, bump 901, or barbs 321, may be of other suitable shapes and methods. The locations of the keying elements may be varied provided the cooperation of the hinge elements produces the desired open and closed positions of radiotelephone 100.

What is claimed is:

1. A wireless communication device having an open position and a closed position, the wireless communication device comprising:

a cover provided with a first cavity;

a body provided with a second cavity;

a hinge joining the cover and the body along an axis, the hinge including, a leaf spring located in the second cavity and fixed to the body, the leaf spring having a bump; and a cam located the first cavity and the second cavity and rotatably fixed to the cover, the cam having a surface in rotatably slideable contact with the leaf spring and the second cavity, the cam further having a short lobe and a long lobe located on the surface;

wherein the short lobe and the bump secure the cover in the closed position, and the long lobe and the bump hold the cover in the open position; and an opening mechanism aligned along the axis and in contact with the cover and the body, wherein the opening mechanism urges the cover from the closed position.

2. The wireless communication device of claim 1, wherein the opening mechanism further urges the cover to the open position.

3. The wireless communication device of claim 2, wherein the long lobe, the bump, and the opening mechanism secure the cover in the open position.

4. The wireless communication device of claim 1, wherein the opening mechanism comprises:

a shaft rotatably fixed to the body; and means for urging the cover from the closed position, the means for urging the cover from the closed position having two ends, one end rotatably fixed to the body and another end rotatably fixed to the cover.

5. The wireless communication device of claim 4, wherein the means for urging the cover from the closed position is a torsional spring.

6. The wireless communication device of claim 1, wherein the wireless communication device is a radiotelephone.

7. A wireless communication device having an open position and a closed position, the wireless communication device comprising:

a cover provided with a first cavity;

a body provided with a second cavity;

a hinge joining the cover and the body along an axis, the hinge including, a leaf spring located in the second cavity and fixed to the body, the leaf spring having a bump; and a cam located the first cavity and the second cavity and rotatably fixed to the cover, the cam having a surface in rotatably slideable contact with the leaf spring and the second cavity, the cam further having a short lobe and a long lobe located on the surface, wherein the cam is axially slideable in the first cavity and the second cavity;

wherein the short lobe and the bump secure the cover in the closed position, and the long lobe and the bump hold the cover in the open position;

means, located in the first cavity between the cam and the cover, for axially forcing the cam into the second cavity; and means, in contact with the cam, for axially forcing the cam away from the second cavity;

wherein, when a user of the wireless communication device actuates the means for axially forcing the cam away from the second cavity, the short lobe clears the bump thus releasing the cover from the closed position.

8. The wireless communication device of claim 7, wherein the means for axially forcing the cam into the second cavity is a compression spring.

9. The wireless communication device of claim 7, wherein the means for axially forcing the cam away from the second cavity is a button.

10. A radiotelephone having an open position and a closed position, the radiotelephone comprising:

a cover provided with a first cavity;

a body provided with a second cavity a hinge joining the cover and the body along an axis, the hinge including,
- a leaf spring located in the second cavity and fixed to the body, the leaf spring having a bump;
- a cam located the first cavity and the second cavity and rotatably fixed to the cover, the cam having a surface in rotatably slideable contact with the leaf spring and the second cavity, the cam further having a short lobe and a long lobe located on the surface;
- wherein the short lobe and the bump secure the cover in the closed position and the long lobe and the bump hold the cover in the open position;
- wherein the cam is axially slideable in the first cavity and the second cavity;

a compression spring, located in the first cavity between the cam and the cover;

a button, in contact with the cam;

wherein, when a user of the radiotelephone actuates the button, the short lobe clears the bump thus releasing the cover from the closed position;

a shaft rotatably fixed to the body; and a torsional spring having two ends, one end rotatably fixed to the body and another end rotatably fixed to the cover, wherein the torsional spring urges the cover from the closed position to the open position and the torsional spring, long lobe, and bump secure the cover in the open position.

* * * * *